US006971969B2

(12) United States Patent
Kitagawa et al.

(10) Patent No.: US 6,971,969 B2
(45) Date of Patent: Dec. 6, 2005

(54) METHOD AND DEVICE FOR DETERMINING TRANSMISSION STATE OF POWER TRANSMISSION DEVICE FOR INTERNAL COMBUSTION ENGINE DRIVEN VEHICLE

(75) Inventors: Yuichi Kitagawa, Numazu (JP); Kazuyoshi Kishibata, Numazu (JP); Hiroyasu Sato, Numazu (JP)

(73) Assignee: Kokusan Denki Co., Ltd., Shizuoka-ken (JP)

( * ) Notice: Subject to any disclaimer, the term of this patent is extended or adjusted under 35 U.S.C. 154(b) by 62 days.

(21) Appl. No.: 10/799,566

(22) Filed: Mar. 11, 2004

(65) Prior Publication Data

US 2004/0180754 A1    Sep. 16, 2004

(30) Foreign Application Priority Data

Mar. 13, 2003    (JP)    .............................. 2003-068655

(51) Int. Cl.[7] .............................................. B60K 1/02
(52) U.S. Cl. ........................................ 477/3; 180/65.4
(58) Field of Search ........................... 477/3; 180/65.4, 180/65.2

(56) References Cited

U.S. PATENT DOCUMENTS 6,138,069 A    10/2000  Ellertson et al.
6,494,277 B1 *  12/2002  Boggs et al. .............. 180/65.2

FOREIGN PATENT DOCUMENTS

JP    2001-321106    8/2001

* cited by examiner

Primary Examiner—Dirk Wright
(74) Attorney, Agent, or Firm—Pearne & Gordon LLP

(57) ABSTRACT

A transmission state determination method of a power transmission device for an internal combustion engine driven vehicle including steps of: driving a generator by an internal combustion engine with a vehicle driven by the internal combustion engine stopped; performing an intake air amount gradually increasing process for gradually increasing the intake air amount of the internal combustion engine when the internal combustion engine is controlled so as to generate predetermined power from the generator; determining that the power transmission device for transmitting the output of the internal combustion engine to wheels of the vehicle is in a state of transmitting power when slight movement of a vehicle body is detected in the intake air amount gradually increasing process; and determining that the power transmission device is in a state of cutting power transmission when movement of the vehicle body is not detected in the intake air amount gradually increasing process.

18 Claims, 3 Drawing Sheets

METHOD AND DEVICE FOR DETERMINING TRANSMISSION STATE OF POWER TRANSMISSION DEVICE FOR INTERNAL COMBUSTION ENGINE DRIVEN VEHICLE

TECHNICAL FIELD OF THE INVENTION

The present invention relates to a transmission state determination method, in an internal combustion engine driven vehicle incorporating a power supply unit that drives a generator by an internal combustion engine to supply power to a load when the vehicle is stopped, for determining whether a power transmission device for transmitting rotation of the internal combustion engine to drive wheels of the vehicle is in a state of cutting power transmission at the time of generation, a transmission state determination device used for implementing the method, and a runaway prevention device of the internal combustion engine driven vehicle for preventing runaway of the vehicle at the time of generation by using the determination device.

BACKGROUND OF THE INVENTION

Some internal combustion engine driven vehicles have been adapted to drive a generator by an internal combustion engine to supply power from the generator to various loads when the vehicles are stopped. Especially in internal combustion engine driven vehicles such as ATVs (All Terrain Vehicles), tractors, or recreation vehicles that are internal combustion engine driven vehicles intended mainly for driving on rough ground, a power supply unit which uses a generator driven by an internal combustion engine for driving a vehicle as a power supply to generate a commercial AC output of AC 100 V or AC 200 V (50 Hz or 60 Hz) have been incorporated, in order to allow electric tools or home appliances to be used outdoors. Such a vehicle is disclosed in, for example, U.S. Pat. No. 6,138,069 or Japanese Patent Application Laid-Open Publication No. 2001-231106.

As a power transmission device that is provided between an internal combustion engine and drive wheels, such a vehicle often uses a transmission such as an automatic transmission or a continuously variable transmission (CVT) having a gear position for cutting power transmission, and an automatic clutch mechanism such as a centrifugal clutch or a torque converter (fluid clutch) that enters a state of transmitting power when a rotational speed of the engine reaches a predetermined power transmission start rotational speed or higher.

A power supply unit incorporated in such a vehicle has an appropriate construction depending on a generator mounted to the internal combustion engine. For example, when a magnetic AC generator in which its field cannot be controlled is used as a generator mounted to the internal combustion engine, a power supply unit is comprised of a rectifier that rectifies the output of the generator, an inverter that converts the output of the rectifier into an AC output at commercial frequencies, and a filter that eliminates harmonic components from the output of the inverter.

When a synchronous generator in which its field can be controlled is used as the generator mounted to the internal combustion engine, a power supply unit is comprised of the generator itself.

As described above, besides an internal combustion engine control unit (ECU) that performs control required for operating the internal combustion engine, a control device of an internal combustion engine driven vehicle incorporating a power supply unit includes: mode selection means for selecting a control mode of the internal combustion engine between a control mode for driving vehicle and a control mode for generating electric power; and a generation control unit having rotational speed control means for generating electric power for controlling an opening degree of a throttle valve of the internal combustion engine or an ISC valve (Idle Speed Control valve) that adjusts the amount of air flowing through an air passage bypassing the throttle valve, so as to rotate the internal combustion engine at a rotational speed required for supplying predetermined power from the power supply unit to a load when the control mode for generating electric power is selected by the mode selection means.

The internal combustion engine control unit is comprised so as to control an ignition timing and a fuel injection amount (when an injector is used as fuel supply means) of the internal combustion engine using various control conditions, such as a rotational speed of the internal combustion engine, a throttle valve opening degree, a temperature of the internal combustion engine, and a gear position of a transmission provided between the internal combustion engine and wheels.

The generation control unit has an appropriate construction depending on the construction of the generator. For example, when the magnetic AC generator is used as the generator, a main part of the generation control unit is comprised of target rotational speed arithmetic operation means for calculating a target rotational speed of the internal combustion engine based on a deviation between a target value of an output voltage of the inverter and an output voltage of the rectifier, and rotational speed control means for generating electric power for controlling an intake air amount of the internal combustion engine so as to keep the rotational speed of the internal combustion engine at the target rotational speed.

Also, when the power supply unit described above is comprised of the synchronous generator that can perform field control, a main part of the generation control unit is comprised of rotational speed control means for generating electric power for controlling the intake air amount of the internal combustion engine so as to rotate the internal combustion engine at a rotational speed required for keeping output frequencies of the synchronous generator at commercial frequencies, and field current control means for controlling a field current of the generator so as to keep an output voltage of the synchronous generator within a set range.

In the case where the power transmission device including the automatic clutch mechanism is used as described above, if a gear position of the transmission is in a position other than a neutral position or a parking position at the time of generation, and the rotational speed is controlled by the rotational speed control means for generating electric power in a state where power is transmitted via the transmission, the automatic clutch enters a state of transmitting power to cause runaway of the vehicle.

In order to prevent occurrence of such a situation, Japanese Patent Application Laid-Open Publication No. 2001-231106 proposes that a gear position sensor that detects a gear position of a transmission is provided, and only when the sensor detects that the gear position is in a position for cutting power transmission, a rotational speed is controlled by rotational speed control means for generating electric power.

However, even by such control, if a failure of the gear position sensor or a failure of the power transmission device causes the gear position sensor to detect by mistake that power transmission is cut, in spite that the power transmission device is in a state of transmitting power, the rotational speed is controlled by the rotational speed control means for generating electric power, and thus a possibility of runaway of the vehicle at the time of generation cannot be completely eliminated.

In order to solve this problem, it is preferable to be able to determine whether the power transmission device is in the state of cutting power transmission or the state of transmitting power (determine a power transmission state) independently of a gear position sensor.

Thus, the applicant has previously proposed a method for determining whether a power transmission device is in a state of cutting power transmission or a state of transmitting power, from a state of a load of an internal combustion engine independently of a gear position sensor.

In the previously proposed method, an opening degree of a throttle valve of the internal combustion engine is gradually increased to gradually increase a rotational speed of the internal combustion engine when a control mode for generating electric power is selected by mode selection means. Then, in this process, when the rotational speed reaches a power transmission start rotational speed of an automatic clutch mechanism, the opening degree of the throttle valve is further increased by a set opening degree that is preset within a range so as not to start the vehicle, and when the size of the load of the internal combustion engine is higher than a reference value, it is determined that the power transmission device is in the state of transmitting power.

Determination of the state of the power transmission device by such a method prevents runaway of the vehicle when a failure of the gear position sensor or a failure of the power transmission device causes the gear position sensor to detect by mistake that power transmission is cut, in spite that the power transmission device is in the state of transmitting power.

However, if the power transmission state is determined from the load of the internal combustion engine when the throttle valve opening degree is gradually increased as the proposed method, it is required to detect an amount that reflects a load in some way. When the amount that reflects the load cannot be accurately detected, it is required to estimate the size of the load by preparing a map for estimating the load, but it is not easy to estimate the size of the load accurately in a short time. If determination of the size of the load takes long time, the transmission state of the power transmission device cannot be determined before the vehicle starts, and there is a possibility that runaway of the vehicle cannot be prevented.

SUMMARY OF THE INVENTION

Therefore, an object of the invention is to provide a transmission state determination method of a power transmission device for an internal combustion engine driven vehicle, which can accurately determine whether the power transmission device is in a state of cutting power transmission or a state of transmitting power, independently of a gear position sensor and without detecting a load of the internal combustion engine, and a transmission state determination device that implements the method.

Another object of the invention is to provide a runaway prevention device of an internal combustion engine driven vehicle.

According to the invention, there is provided a method for determining whether a power transmission device for an internal combustion engine driven vehicle is in a state of cutting power transmission or a state of transmitting power, the vehicle including: an internal combustion engine incorporated in a vehicle body having drive wheels; an AC generator incorporated in the vehicle body and driven by the internal combustion engine; mode selection means for selecting a control mode of the internal combustion engine between a control mode for driving vehicle and a control mode for generating electric power; and a generation control unit having rotational speed control means for generating electric power for controlling an intake air amount of the internal combustion engine so as to rotate the internal combustion engine at a rotational speed required for generating predetermined power from the generator when the control mode for generating electric power is selected by the mode selection means. The power transmission device has a transmission with a gear position for cutting power transmission and an automatic clutch mechanism and is provided between a crankshaft of the internal combustion engine and the drive wheels.

In the determination method according to the invention, a displacement sensor that can detect movement of the vehicle body is provided. The determination method comprises the steps of gradually increasing the intake air amount of the internal combustion engine while a rotational speed of the internal combustion engine is monitored when the control mode for generating electric power is selected; determining the power transmission device is in the state of transmitting power when the displacement sensor detects movement of the vehicle body in the process of gradually increasing the intake air amount; and determining the power transmission device is in the state of cutting power transmission when the displacement sensor does not detect movement of the vehicle body before the rotational speed of the internal combustion engine exceeds a preset reference rotational speed in the process of gradually increasing the intake air amount. The reference rotational speed is set to a rotational speed when the automatic clutch mechanism starts power transmission (power transmission start rotational speed) or higher.

If the intake air amount of the internal combustion engine is gradually increased from the amount of air at idling, the automatic clutch mechanism enters the state of transmitting power when the rotational speed of the internal combustion engine reaches the power transmission start rotational speed. If the gear position of the transmission of the power transmission device is in a position for transmitting power at this time, part of a driving force of the internal combustion engine is transmitted to the drive wheels to cause the vehicle body to start. According to the invention, the displacement sensor detects the movement of the vehicle body at this time, and when the displacement sensor detects slight movement of the vehicle body, it is determined that the power transmission device is in the state of transmitting power.

Detecting the transmission state of the power transmission device by this method ensures detection of the power transmission state of the power transmission device, even when a failure of the gear position sensor or a failure of the transmission of the power transmission device prevents the gear position sensor from accurately detecting the transmission state of the power transmission device, for example, when a failure of the transmission causes the transmission to be in the state of transmitting power in spite that the gear position is in a neutral position. Since detection of a load of the internal combustion engine is not required, the invention can be readily applied to a vehicle having no means for detecting a load of an internal combustion engine.

Further, since the displacement sensor can instantaneously detect whether the vehicle body moves, the transmission state of the power transmission device can be rapidly determined, thus preventing occurrence of a situation where delay in determination causes impossibility of preventing runaway of the vehicle.

According to the invention, there is also provided a transmission state determination device for determining whether a power transmission device for an internal combustion engine driven vehicle is in a state of cutting power transmission or a state of transmitting power, the vehicle including: an internal combustion engine incorporated in a vehicle body having drive wheels; an actuator that operates means for adjusting an intake air amount of the internal combustion engine; an AC generator incorporated in the vehicle body and driven by the internal combustion engine; mode selection means for selecting a control mode of the internal combustion engine between a control mode for driving vehicle and a control mode for generating electric power; and a generation control unit having rotational speed control means for generating electric power for controlling the intake air amount of the internal combustion engine so as to rotate the internal combustion engine at a rotational speed required for generating predetermined power from the generator when the control mode for generating electric power is selected by the mode selection means. The power transmission device has a transmission with a gear position for cutting power transmission and an automatic clutch mechanism and is provided between a crankshaft of the internal combustion engine and the drive wheels.

The transmission state determination device according to the invention comprises rotational speed detection means for detecting a rotational speed of the internal combustion engine and a displacement sensor that detects movement of the vehicle body. The transmission state determination device also comprises: intake air amount control means for determining transmission state for controlling the actuator so as to gradually increase the intake air amount of the internal combustion engine when the control mode for generating electric power is selected by the mode selection means; and determination means for determining that the power transmission device is in the state of transmitting power when the displacement sensor detects movement of the vehicle body in the process of gradually increasing the intake air amount by the intake air amount control means for determining transmission state, and that the power transmission device is in the state of cutting power transmission when the displacement sensor does not detect movement of the vehicle body before the rotational speed detected by the rotational speed detection means exceeds a set reference rotational speed in the process of gradually increasing the intake air amount.

According to the invention, there is also provided a device for preventing runaway of an internal combustion engine driven vehicle when a control mode for generating electric power is selected, the internal combustion engine driven vehicle including: an internal combustion engine incorporated in a vehicle body having drive wheels; a power transmission device that has a transmission with a gear position for cutting power transmission and an automatic clutch mechanism that enters a state of transmitting power when a rotational speed of the internal combustion engine reaches a predetermined power transmission start rotational speed or higher, and is provided between a crankshaft of the internal combustion engine and the drive wheels; an actuator that operates means for adjusting an intake air amount of the internal combustion engine; an AC generator incorporated in the vehicle body and driven by the internal combustion engine; mode selection means for selecting a control mode of the internal combustion engine between a control mode for driving vehicle and a control mode for generating electric power; and a generation control unit having rotational speed control means for generating electric power for controlling the intake air amount of the internal combustion engine so as to rotate the internal combustion engine at a rotational speed required for generating predetermined power from the generator when the control mode for generating electric power is selected by the mode selection means.

The runaway prevention device according to the invention includes: rotational speed detection means for detecting a rotational speed of the internal combustion engine; a displacement sensor that detects movement of the vehicle body; intake air amount control means for determining transmission state for controlling the actuator so as to gradually increase the intake air amount of the internal combustion engine when the control mode for generating electric power is selected by the mode selection means; determination means for determining that the power transmission device is in a state of transmitting power when the displacement sensor detects movement of the vehicle body in the process of gradually increasing the intake air amount by the intake air amount control means for determining transmission state, and that the power transmission device is in a state of cutting power transmission when the displacement sensor does not detect movement of the vehicle body before the rotational speed detected by the rotational speed detection means exceeds a reference rotational speed in the process of gradually increasing the intake air amount; and safety means for controlling the internal combustion engine so as to return the rotational speed of the internal combustion engine to a rotational speed less than the power transmission start rotational speed or to stop the internal combustion engine when the determination means determines that the power transmission device is in the state of transmitting power.

BRIEF DESCRIPTION OF THE DRAWINGS

The above and other objects and features of the present invention will be apparent from the detailed description of the preferred embodiment of the invention, which is described and illustrated with reference to the accompanying drawings, in which.

DETAILED DESCRIPTION OF THE PREFERRED EMBODIMENTS

Now, an embodiment of the invention will be described with reference to the drawings.

The invention is applied to an internal combustion engine driven vehicle such as an ATV (All Terrain Vehicle), a tractor, or a recreational vehicle. However, an internal combustion engine driven vehicle to which the invention is applied may incorporate a power supply unit that uses an AC generator mounted to an internal combustion engine for driving the vehicle as a power supply to generate AC power at predetermined frequencies, and use, a structure, and a type of the vehicle are arbitrary.

Figure 1:
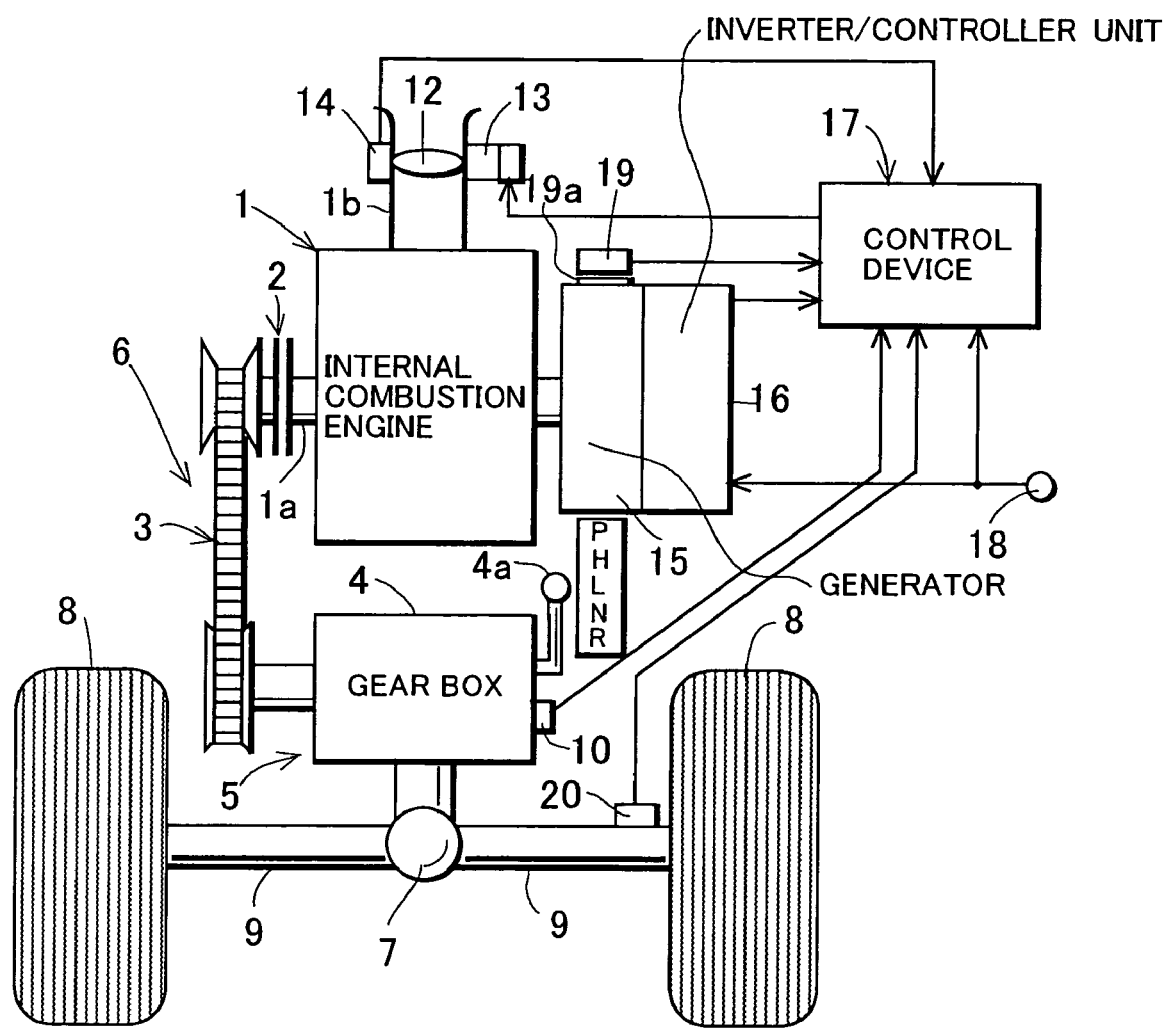
FIG. 1 is a schematic diagram of a construction of a vehicle to which the invention is applied.
Figure 2:
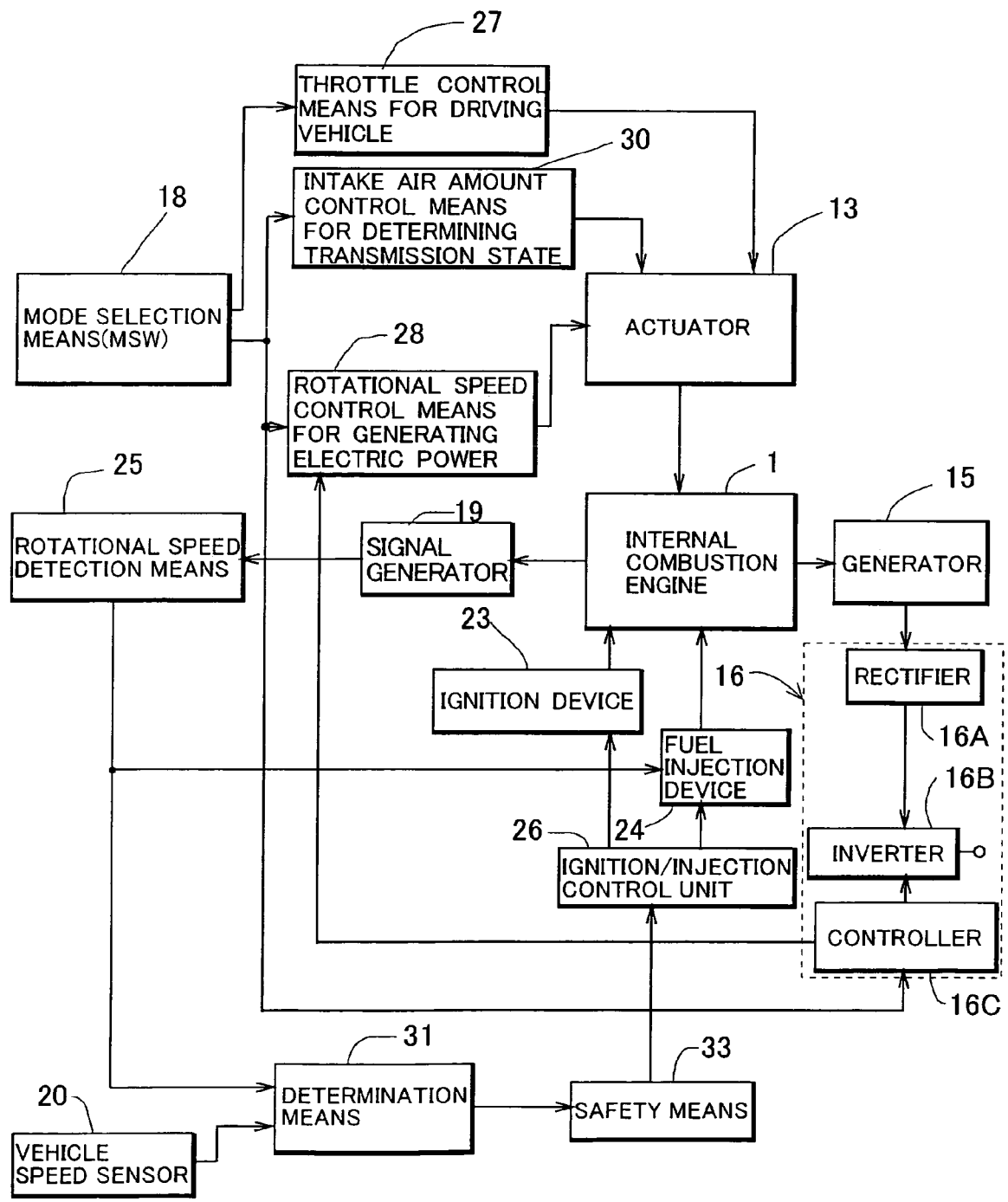
FIG. 2 is a block diagram of an entire construction of an embodiment of the invention.

FIG. 1 shows an example of an entire construction of an internal combustion engine driven vehicle to which the invention is applied, and FIG. 2 is a block diagram of an entire construction of an embodiment of the invention.

In FIG. 1, a reference numeral 1 denotes an internal combustion engine incorporated in a vehicle body (not shown). An end of a crankshaft 1a of the internal combustion engine 1 is connected to an axle 9 supported by the vehicle body, via a power transmission device 6 including an automatic clutch 2 and a CVT (continuously variable transmission) 5 having a belt transmission mechanism 3 and a gear box 4, and a gear mechanism 7. Drive wheels 8 of the vehicle are mounted to the axle 9.

The automatic clutch mechanism 2 according to the embodiment is a centrifugal clutch mechanism, and enters a state of transmitting power when a rotational speed of the internal combustion engine reaches a power transmission start rotational speed.

A gear position selection lever 4a is mounted to the gear box 4, and the lever is operated to switch a gear position to a parking position P, a high position H, a low position L, a neutral position N, or a reverse (backing up) position R. A gear position sensor 10 that detects the gear positions is mounted to the gear box 4. Among the gear positions, the neutral position N and the parking position P are positions for cutting power transmission from the internal combustion engine to the drive wheels, and the high position H, the low position L, and the reverse (backing up) position R are positions for transmitting power from the internal combustion engine to the drive wheels.

A throttle valve 12 is mounted to an intake pipe 1b of the internal combustion engine, and an output shaft of an electric actuator 13 is connected to an operation shaft of the throttle valve. An input shaft of a throttle sensor 14 that generates an electric signal proportional to an opening degree of the throttle valve is also connected to the operation shaft of the throttle valve 12.

An unshown injector (an electromagnetic fuel injection valve) is mounted to the intake pipe 1b of the internal combustion engine 1, and an ignition plug is mounted to a cylinder head of the internal combustion engine.

A rotor of a generator 15 is mounted to the other end of the crankshaft 1a of the internal combustion engine 1. A stator of the generator is secured to a mounting portion provided on a case or a cover of the internal combustion engine.

The shown generator 15 is a magnetic AC generator, and an AC output obtained from the generator 15 is input to an inverter/controller unit 16.

The inverter/controller unit 16 includes, in one unit, a rectifier 16A that rectifies the AC output of the generator 15, an inverter 16B that converts the output of the rectifier 16A into an AC output, and a controller 16C, as shown in FIG. 2. The controller 16C includes inverter control means for controlling the inverter 16B so as to output an AC voltage $V_0$ at commercial frequencies from the inverter 16B, and target rotational speed arithmetic operation means for arithmetically operating, as a target rotational speed $N_0$, a rotational speed of the internal combustion engine required for matching the output voltage of the inverter with a target value based on a deviation between a target value of the AC voltage (an effective value) output from the inverter and a DC voltage output from the rectifier.

In this embodiment, a power supply unit that generates an AC voltage at commercial frequencies when the vehicle is stopped is comprised of the generator 15 and the inverter/controller unit 16.

In FIG. 1, a reference numeral 17 denotes a control device having a microprocessor, and mode selection means 18 constituted by a manually operated mode selection switch (MSW) provides a selection instruction to the control device to select a control mode between a control mode for driving vehicle and a control mode for generating electric power. The selection instruction issued by the mode selection means 18 is also provided to the controller in the inverter/controller unit 16.

A signal generator 19 that generates a pulse signal at a particular crank angle position of the internal combustion engine is mounted to the internal combustion engine 1, and the output of the signal generator is input to the control device 17 together with the output of the gear position sensor 10 and the output of the throttle sensor 14.

The shown signal generator 19 is comprised so as to generate a pulse signal when a leading edge and a trailing edge in a rotational direction of a reluctor (inductor) 19a constituted by a protrusion on an outer periphery of a rotor yoke of the generator 15 are detected.

A reference numeral 20 denotes a vehicle speed sensor comprised so as to output a vehicle speed pulse for each rotation of the axle 9 through a certain angle, and in this embodiment, the vehicle speed sensor is used as a displacement sensor that detects movement of the vehicle body. The output of the vehicle speed sensor 20 is input to the control device 17. The vehicle speed sensor 20 is known and comprised of a rotor mounted to the axle 9 or provided so as to rotate synchronously with the axle 9, and a sensor (a pickup coil or a Hall IC) that detects a reluctor or a magnet provided on the rotor to generate a pulse for each rotation of the axle through a certain angle.

The inverter control means provided in the controller 16C of the inverter/controller unit 16 controls on/off of a switch element that constitutes the inverter at a predetermined timing so as to output the AC voltage at predetermined frequencies (generally, commercial frequencies) from the inverter.

The target rotational speed arithmetic operation means provided in the controller 16C arithmetically operates, as the target rotational speed, the rotational speed of the internal combustion engine required for matching the output voltage of the inverter with the target value based on the deviation between the target value of the AC voltage $V_0$ output from the inverter 16B and the DC voltage output from the rectifier 16A that rectifies the output of the generator 15, and provides a signal that indicates the target rotational speed to the control device 17.

Various sensors (not shown) that detect control conditions (temperature of the internal combustion engine, atmospheric pressure, or the like) used for controlling an ignition timing and a fuel injection amount of the internal combustion engine are provided, and outputs of the sensors are input to the control device 17.

The control device 17 is comprised of an internal combustion engine control unit (ECU) that performs control required for operating the internal combustion engine (control of an ignition timing or control of fuel injection time); a generation control unit that controls a throttle valve opening degree of the internal combustion engine to control an intake air amount of the internal combustion engine so as to rotate the internal combustion engine at a rotational speed required for supplying predetermined power from the power supply unit to a load, and a determination/safety control unit that determines whether the power transmission device is in a state of transmitting power when the control mode is shifted to the control mode for generating electric power, and performs control for preventing increase in the rotational speed of the internal combustion engine when it is determined that the power transmission device is in the state of transmitting power.

As shown in FIG. 2, the internal combustion engine control unit includes: an ignition device 23 that provides a high voltage for ignition to an ignition plug to perform an ignition operation when an ignition signal is provided; a fuel injection device 24 that provides a drive current to the injector to inject fuel from the injector when an injection instruction signal is provided; rotational speed detection means 25 for arithmetically operating the rotational speed of the internal combustion engine from a generation interval (a time required for the crankshaft to rotate through a certain angle) of pulse signals output by the signal generator 19; an ignition/injection control unit 26 that controls the ignition device 23 and the fuel injection device 24 in accordance with the arithmetically operated rotational speed and the various control conditions such as the throttle valve opening degree; and throttle control means for driving vehicle 27 for controlling the actuator 13 so as to adjust the opening degree of the throttle valve 12 in accordance with a driver's accelerator operation when the control mode for driving vehicle is selected by the mode selection means 18.

The ignition/injection control means 26 is comprised of ignition timing arithmetic operation means and injection amount arithmetic operation means for arithmetically operating an ignition timing and a fuel injection amount, respectively, of the internal combustion engine; ignition signal generation means for generating an ignition signal to be provided to an ignition circuit when the arithmetically operated ignition timing is detected; and injection instruction signal generation means for generating an injection instruction signal to be provided to an injector drive circuit when a predetermined injection start timing is detected.

The injection instruction signal is a rectangular wave signal having a signal width required for injecting the fuel of the arithmetically operated injection amount, and the fuel is injected from the injector while the injection instruction signal is generated.

The generation control unit performs control required for keeping the AC output voltage output from the inverter of the inverter/controller unit 16 within a set range, and includes rotational speed control means for generating electric power 28 for controlling the actuator 13 to adjust the opening degree of the throttle valve 12 so as to match the rotational speed of the internal combustion engine 1 with the target rotational speed arithmetically operated by the controller in the inverter/controller unit 16, when the control mode for generating electric power is selected by the mode selection means 18, and the gear position sensor 10 detects that the gear position of the transmission 5 is in the neutral position or the parking position.

The generation control unit is comprised so that the rotational speed control means for generating electric power performs control only when the control mode for generating electric power is selected by the mode selection means 18 in a state where the gear position sensor 10 detects that the gear position is in the neutral position N or the parking position P (both are the gear positions for cutting power transmission), and a shift to the control mode for generating electric power is not performed when the control mode for generating electric power is selected by the mode selection means 18 in a state where the gear position switch is not in the neutral position or the parking position.

The determination/safety control unit determines a transmission state of the power transmission device by the method according to the invention when the control mode for generating electric power is selected, and controls to reduce the rotational speed of the internal combustion engine to a rotational speed less than the power transmission start rotational speed or to stop the internal combustion engine in order to prevent runaway of the vehicle when it is determined that the power transmission device is in the state of transmitting power.

The determination/safety control unit according to the embodiment is comprised of intake air amount control means for determining transmission state 30 for controlling the actuator 13 so as to gradually increase the throttle valve opening degree of the internal combustion engine (gradually increase the intake air amount) when the control mode for generating electric power is selected by the mode selection means; determination means 31 for determining that the power transmission device is in the state of transmitting power when slight movement of the vehicle body is detected from the vehicle speed pulse output by the vehicle speed sensor 20 (displacement sensor) in the process of gradually increasing the throttle valve opening degree to increase the intake air amount by the control means 30, and that the power transmission device is in the state of cutting power transmission when movement of the vehicle body is not detected from the vehicle speed pulse before the rotational speed detected by the rotational speed detection means exceeds a reference rotational speed set to the power transmission start rotational speed of the automatic clutch mechanism 2 or higher in the process of gradually increasing the intake air amount; and safety means 33 for controlling the engine so as to return the rotational speed of the internal combustion engine to a rotational speed less than the power transmission start rotational speed or to stop the internal combustion engine when the determination means determines that the power transmission device is in the state of transmitting power.

The safety means 33 may be comprised of means for controlling the actuator 13 so as to return the throttle valve opening degree to an idle opening degree when the determination means 31 determines that the power transmission device is in the state of transmitting power, or means for stopping an ignition operation of the internal combustion engine when the determination means 31 determines that the power transmission device is in the state of transmitting power. The safety means 33 may be also comprised of means for stopping supply of fuel to the internal combustion engine when the determination means 31 determines that the power transmission device is in the state of transmitting power.

In the example in FIG. 2, it is assumed that the safety means 33 is comprised of the means for stopping the ignition operation of the internal combustion engine 1 when the determination means 31 determines that the power transmission device is in the state of transmitting power, or the means for stopping supply of fuel to the internal combustion engine (stopping fuel injection from the injector) when the determination means 31 determines that the power transmission device is in the state of transmitting power.

In the internal combustion engine driven vehicle in FIG. 1, when the control mode for driving vehicle is selected by the mode selection means 18, the throttle control means for driving vehicle 27 controls the actuator 13 so as to adjust the opening degree of the throttle valve 12 in accordance with the driver's accelerator operation, and controls the rotational speed of the internal combustion engine 1 so as to cause the vehicle to drive at a predetermined rotational speed.

In driving the vehicle, it is not always necessary that the throttle control means for driving vehicle 27 controls the actuator so as to adjust the throttle valve opening degree, but the throttle control means for driving vehicle 27 may be omitted to mechanically operate the throttle valve in accordance with the driver's accelerator operation.

When the control mode for generating electric power is selected by the mode selection means 18 in the state where the gear position sensor 10 detects that the gear position is in the neutral position N or the parking position P, the control device 17 first performs a determination process for determining whether the power transmission device 6 is in the state of cutting power transfer or the state of transmitting power by the transmission state determination method according to the invention, and when it is determined that the power transmission device 6 is in the state of cutting power transmission, the control mode is shifted to the control mode for generating electric power to cause the rotational speed control means for generating electric power to perform control. When it is determined in the determination process that the power transmission device is in the state of transmitting power, the safety means 33 controls the engine so as to return the rotational speed of the internal combustion engine to the rotational speed less than the power transmission start rotational speed or to stop the internal combustion engine.

In the determination process for determining the transmission state of the power transmission device, the transmission state determination means according to the invention determines whether the power transmission device is in the state of transmitting power. Specifically, in the determination process, the intake air amount control means for determining transmission state 30 drives the actuator 13 while monitoring the rotational speed of the internal combustion engine 1 to gradually increase the opening degree of the throttle valve 12 of the internal combustion engine to increase the intake air amount of the engine. Then, it is determined that the power transmission device 6 is in the state of transmitting power when slight movement of the vehicle body is detected from the output of the vehicle speed sensor 20 before the rotational speed of the internal combustion engine exceeds the reference rotational speed set to the power transmission start rotational speed (the rotational speed when the automatic clutch mechanism 2 starts power transmission) or higher in the process of gradually increasing the intake air amount, and that the power transmission device 6 is in the state of cutting power transmission when movement of the vehicle body is not detected from the output of the vehicle speed sensor 20 before the rotational speed of the internal combustion engine exceeds the reference rotational speed set to the power transmission start rotational speed or higher in the process of gradually increasing the intake air amount.

For detecting from the output of the vehicle speed sensor whether the vehicle body slightly moves, a vehicle speed may be arithmetically operated from the generation interval (time) of the vehicle speed pulses output by the vehicle speed sensor and the diameter of the wheel to detect that the vehicle body moves when the arithmetically operated vehicle speed reaches a determination reference value preset to a sufficiently low value (for example, 2 km/h) or higher, and that the vehicle body does not move when the vehicle speed does not reach the determination reference value.

Alternatively, it may be determined that the power transmission device is in the state of transmitting power when at least one vehicle speed pulse is detected in the process of gradually increasing the intake air amount, and that the power transmission device is in the state of cutting power transmission when no vehicle speed pulse is detected before the rotational speed of the internal combustion engine exceeds the reference rotational speed set to the power transmission start rotational speed or higher in the process of gradually increasing the intake air amount.

Thus, it is determined that the power transmission device is in the state of transmitting power when at least one vehicle speed pulse is detected in the process of gradually increasing the intake air amount, thereby allowing rapid detection that the power transmission device is in the state of transmitting power. This ensures preventing the vehicle from moving when the power transmission device is in the state of transmitting power for some reason, in the state where the gear position sensor 10 detects that the gear position is in the neutral position N or the parking position P when the control mode is shifted to the control mode for generating electric power.

In the embodiment, the transmission state determination device of the power transmission device for the internal combustion engine driven vehicle is comprised of the rotational speed detection means 25 provided in the control device 17, the intake air amount control means for determining transmission state 30, and the determination means 31.

The runaway prevention device of the internal combustion engine driven vehicle is comprised of the transmission state determination device and the safety means 33.

Figure 3:
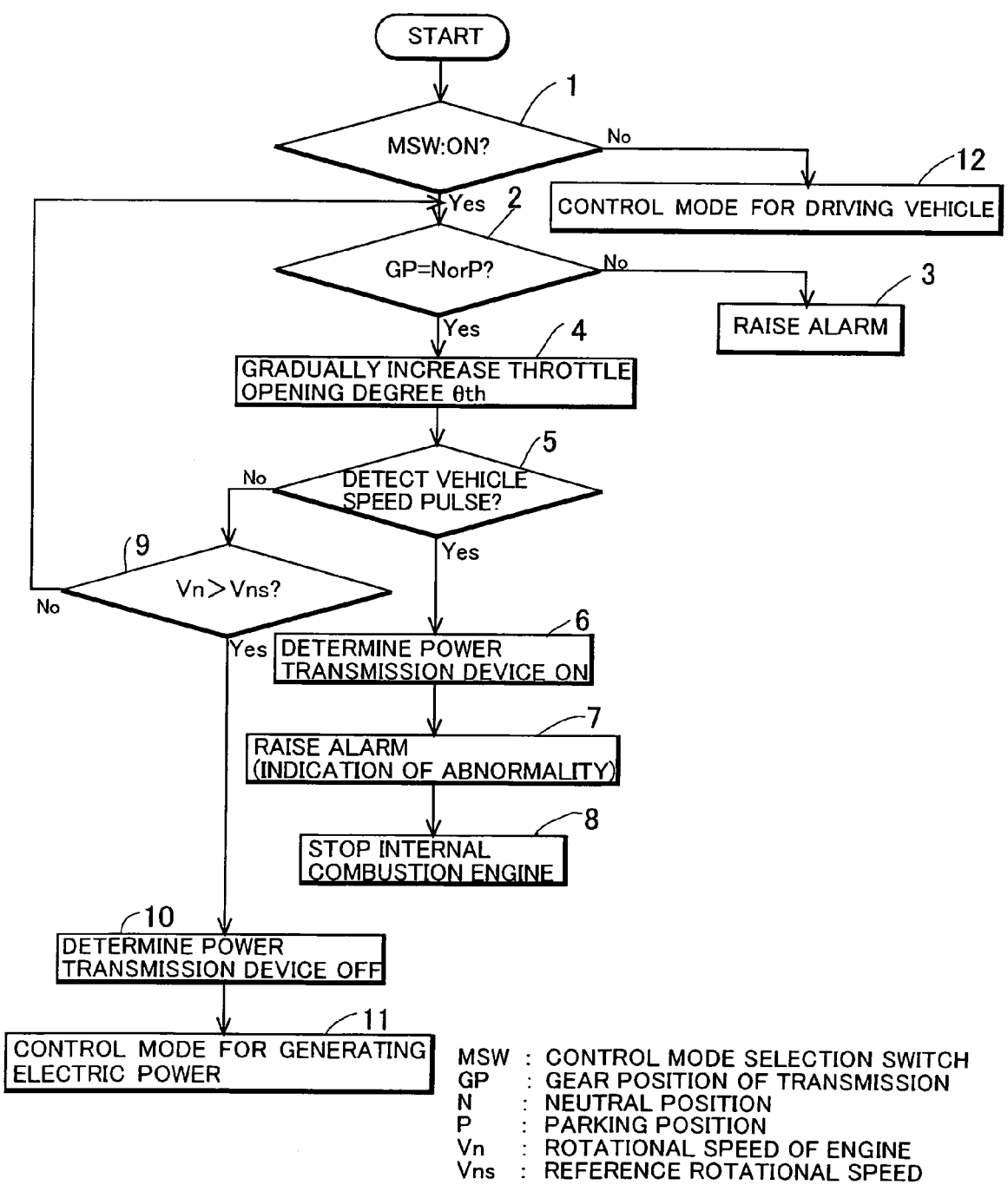
FIG. 3 is a flowchart of an example of an algorithm of essential portions of a program executed by a microprocessor in order to implement a method of the invention.

The control device 17 in the example in FIG. 1 includes the microprocessor, and a predetermined program is executed by the microprocessor to construct various means required for constructing the internal combustion engine control unit, the generation control unit, and the determination/safety control unit. FIG. 3 shows an example of an algorithm of essential portions of the program executed by the microprocessor in order to construct the determination/safety control unit.

According to the algorithm, first in Step 1, it is determined whether the control mode selection switch MSW that constitutes the mode selection means is in an on state (whether the control mode for generating electric power is selected). When it is determined that the control mode selection switch is in the on state and the control mode for generating electric power is selected, the process goes to Step 2, and it is determined whether the gear position of the transmission is in the neutral position N or the parking position P. When the gear position GP of the transmission is not in the neutral position N or the parking position P (the position for cutting power transmission), the process goes to Step 3, and an alarm is raised to prohibit a shift to the control mode for generating electric power.

In Step 2, when it is determined that the gear position of the transmission is in the neutral position N or the parking position P, the process goes to Step 4, and the actuator 13 is controlled so as to gradually increase the throttle valve opening degree θth from the idle opening degree to gradually increase the rotational speed Vn of the internal combustion engine. Then, it is determined in Step 5 whether the vehicle speed pulse is detected, and when the vehicle speed pulse is detected, the process goes to Step 6 to determine that the power transmission device is in the state of transmitting power (an on state). Then, an alarm is raised in Step 7, and the internal combustion engine is stopped in Step 8.

When the vehicle speed pulse is not detected in Step 5, the process goes to Step 9, and it is determined whether the rotational speed Vn exceeds the reference rotational speed Vns set to the power transmission start rotational speed or higher, and when the rotational speed does not exceed the reference rotational speed, the process returns to Step 2.

When it is determined in Step 9 that the rotational speed of the engine exceeds the reference rotational speed, the process goes to Step 10 to determine that the power transmission device is in the state of cutting power transmission (an off state), and the control mode is shifted to the control mode for generating electric power in Step 11.

When it is determined in Step 1 that the control mode selection switch MSW is in an off state, the process goes to Step 12, and the control mode is shifted to the vehicle control mode for driving vehicle.

According to the algorithm in FIG. 3, in Step 4, the intake air amount control means for determining transmission state 30 is comprised, and in Steps 5, 6, 9, and 10, the determination means 31 is comprised. In Step 7, the safety means 33 is comprised.

In the example, the vehicle speed sensor 20 is mounted to the axle 9 to which the drive wheels 8 are mounted, but the vehicle speed sensor 20 may be mounted to an axle on the non-drive side.

In the embodiment, the magneto generator is used as the generator, but a synchronous generator in which its field can be controlled may be used. When the synchronous generator in which its field can be controlled is used, the rotational speed of the internal combustion engine is controlled and kept constant, and a field current is controlled so as to keep an output voltage of the generator at a set value so that output frequencies of the generator reach predetermined frequencies when the control mode is shifted to the control mode for generating electric power.

In the embodiment, the actuator is mounted to the throttle valve, and the intake air amount of the engine is changed by changing the opening degree of the throttle valve when the control mode for generating electric power is selected. However, when an ISC valve (Idle Speed Control valve) or an IAC valve (Idle Air Control valve) that adjusts the amount of air flowing through an air passage bypassing the throttle valve is provided, the intake air amount of the engine may be changed by controlling the opening degree of the valve.

In the embodiment, the centrifugal clutch mechanism is used as the automatic clutch mechanism, but the invention may be applied to the case where a torque converter (fluid clutch) is used as an automatic clutch mechanism.

In the embodiment, the continuously variable transmission is used as the transmission provided in the power transmission device, but the invention may be applied to the case where an automatic transmission that stepwise changes the transmission gear ratio is used.

The preferable embodiment has been described above, and the invention disclosed herein will be organized as described below.

The transmission state determination method according to the invention is the method for determining whether the power transmission device for the internal combustion engine driven vehicle is in the state of cutting power transmission or the state of transmitting power, the power transmission device including: the internal combustion engine incorporated in the vehicle body having the drive wheels; the power transmission device that has the transmission with the gear position for cutting power transmission and the automatic clutch mechanism and is provided between the crankshaft of the internal combustion engine and the drive wheels; the AC generator incorporated in the vehicle body and driven by the internal combustion engine; the mode selection means for selecting the control mode of the internal combustion engine between the control mode for driving vehicle and the control mode for generating electric power; and the generation control unit having the rotational speed control means for generating electric power for controlling the intake air amount of the internal combustion engine so as to rotate the internal combustion engine at the rotational speed required for generating the predetermined power from the generator when the control mode for generating electric power is selected by the mode selection means.

In the invention, the displacement sensor that can detect movement of the vehicle body is prepared, and the intake air amount of the internal combustion engine is gradually increased while the rotational speed of the internal combustion engine is monitored when the control mode for generating electric power is selected. When the displacement sensor detects movement of the vehicle body in this process, it is determined that the power transmission device is in the state of transmitting power. When the displacement sensor does not detect movement of the vehicle body before the rotational speed of the internal combustion engine exceeds the preset reference rotational speed in the process of gradually increasing the intake air amount, it is determined that the power transmission device is in the state of cutting power transmission.

The reference rotational speed is set to the rotational speed when the automatic clutch mechanism starts power transmission (power transmission start rotational speed) or higher.

The displacement sensor may be a sensor that can detect movement of the vehicle body by the power transmitted from the internal combustion engine through the power transmission device. As the displacement sensor, a sensor that detects displacement (rotation) of the axle or displacement of the wheels, or a sensor that detects slight displacement of the vehicle body itself may be used. A general vehicle has a vehicle speed sensor that generates a vehicle speed pulse for each rotation of an axle through a certain angle, and it is convenient to use the vehicle speed sensor as the displacement sensor.

As the sensor that detects displacement of the vehicle body itself, for example, an acceleration sensor can be used.

In a preferable mode of the invention, the vehicle speed sensor that generates a vehicle speed pulse for each rotation of the axle of the vehicle through a certain angle is used as the displacement sensor. When the vehicle speed sensor is used as the displacement sensor, the intake air amount of the internal combustion engine is gradually increased while the rotational speed of the internal combustion engine is monitored when the control mode for generating electric power is selected, and when generation of the vehicle speed pulse by the vehicle speed sensor is detected in the process of gradually increasing the intake air amount, it is determined that the power transmission device is in the state of transmitting power. When generation of the vehicle speed pulse by the vehicle speed sensor is not detected before the rotational speed of the internal combustion engine exceeds the preset reference rotational speed in the process of gradually increasing the intake air amount, it is determined that the power transmission device is in the state of cutting power transmission.

In the case where the vehicle speed sensor is used as the displacement sensor, it may be determined that the power transmission device is in the state of transmitting power when the vehicle speed obtained from the vehicle speed pulse reaches the set determination reference value or higher in the process of gradually increasing the intake air amount, and that the power transmission device is in the state of cutting power transmission when the vehicle speed obtained from the vehicle speed pulse does not reach the determination reference value before the rotational speed of the internal combustion engine exceeds the preset reference rotational speed in the process of gradually increasing the intake air amount.

The transmission state determination device according to the invention is the device for determining whether the power transmission device for the internal combustion engine driven vehicle is in the state of cutting power transmission or the state of transmitting power, the power transmission device including: the internal combustion engine incorporated in the vehicle body having the drive wheels; the power transmission device that has the transmission with the gear position for cutting power transmission and the automatic clutch mechanism and is provided between the crankshaft of the internal combustion engine and the drive wheels; the actuator that operates the means for adjusting the intake air amount of the internal combustion engine; the AC generator incorporated in the vehicle body and driven by the internal combustion engine; the mode selection means for selecting the control mode of the internal combustion engine between the control mode for driving vehicle and the control mode for generating electric power; and the generation control unit having the rotational speed control means for generating electric power for controlling the intake air amount of the internal combustion engine so as to rotate the internal combustion engine at the rotational speed required for generating the predetermined power from the generator when the control mode for generating electric power is selected by the mode selection means.

The transmission state determination device according to the invention includes: the rotational speed detection means for detecting the rotational speed of the internal combustion engine; the displacement sensor that detects movement of the vehicle body; the intake air amount control means for determining transmission state for controlling the actuator so as to gradually increase the intake air amount of the internal combustion engine when the control mode for generating electric power is selected by the mode selection means; and the determination means for determining that the power transmission device is in the state of transmitting power when the displacement sensor detects movement of the vehicle body in the process of gradually increasing the intake air amount by the intake air amount control means for determining transmission state, and that the power transmission device is in the state of cutting power transmission when the displacement sensor does not detect movement of the vehicle body before the rotational speed detected by the rotational speed detection means exceeds the set reference rotational speed in the process of gradually increasing the intake air amount.

In a preferable mode of the invention, the vehicle speed sensor that generates a vehicle speed pulse for each rotation of the axle of the vehicle through a certain angle is used as the displacement sensor.

In this case, the determination means is comprised so as to determine that the power transmission device is in the state of transmitting power when the vehicle speed pulse is detected in the process of gradually increasing the intake air amount by the intake air amount control means for determining transmission state, and that the power transmission device is in the state of cutting power transmission when the vehicle speed pulse is not detected before the rotational speed detected by the rotational speed detection means exceeds the reference rotational speed in the process of gradually increasing the intake air amount.

In the case where the vehicle speed sensor that generates a vehicle speed pulse for each rotation of the axle of the vehicle through a certain angle is used as the displacement sensor, the determination means may be comprised so as to determine that the power transmission device is in the state of transmitting power when the vehicle speed obtained from the vehicle speed pulse reaches the set determination reference value or higher in the process of gradually increasing the intake air amount by the intake air amount control means for determining transmission state, and that the power transmission device is in the state of cutting power transmission when the vehicle speed obtained from the vehicle speed pulse does not reach the determination reference value before the rotational speed of the internal combustion engine exceeds the predetermined reference rotational speed in the process of gradually increasing the intake air amount.

The runaway prevention device according to the invention is the device for preventing runaway of the internal combustion engine driven vehicle when the control mode for generating electric power is selected, the internal combustion engine driven vehicle including: the internal combustion engine incorporated in the vehicle body having the drive wheels; the power transmission device that has the transmission with the gear position for cutting power transmission and the automatic clutch mechanism that enters the state of transmitting power when the rotational speed of the internal combustion engine reaches the predetermined power transmission start rotational speed or higher, and is provided between the crankshaft of the internal combustion engine and the drive wheels; the actuator that operates the means for adjusting the intake air amount of the internal combustion engine; the AC generator incorporated in the vehicle body and driven by the internal combustion engine; the mode selection means for selecting the control mode of the internal combustion engine between the control mode for driving vehicle and the control mode for generating electric power; and the generation control unit having the rotational speed control means for generating electric power for controlling the intake air amount of the internal combustion engine so as to rotate the internal combustion engine at the rotational speed required for generating the predetermined power from the generator when the control mode for generating electric power is selected by the mode selection means.

The runaway prevention device according to the invention includes: the rotational speed detection means for detecting the rotational speed of the internal combustion engine; the displacement sensor that detects movement of the vehicle body; the intake air amount control means for determining transmission state for controlling the actuator so as to gradually increase the intake air amount of the internal combustion engine when the control mode for generating electric power is selected by the mode selection means; the determination means for determining that the power transmission device is in the state of transmitting power when the displacement sensor detects movement of the vehicle body in the process of gradually increasing the intake air amount by the intake air amount control means for determining transmission state, and that the power transmission device is in the state of cutting power transmission when the displacement sensor does not detect movement of the vehicle body before the rotational speed detected by the rotational speed detection means exceeds the set reference rotational speed in the process of gradually increasing the intake air amount; and the safety means for controlling the internal combustion engine so as to return the rotational speed of the internal combustion engine to the rotational speed less than the power transmission start rotational speed or to stop the internal combustion engine when the determination means determines that the power transmission device is in the state of transmitting power.

When the vehicle speed sensor that generates a plurality of vehicle speed pulses for one rotation of the axle of the vehicle is used as the displacement sensor, the determination means is comprised so as to determine that the power transmission device is in the state of transmitting power when the vehicle speed pulses are detected in the process of gradually increasing the intake air amount by the intake air amount control means for determining transmission state, and that the power transmission device is in the state of cutting power transmission when the vehicle speed pulses are not detected before the rotational speed detected by the rotational speed detection means exceeds the set reference rotational speed in the process of gradually increasing the intake air amount, or comprised so as to determine that the power transmission device is in the state of transmitting power when the vehicle speed obtained from the vehicle speed pulses reaches the set determination reference value or higher in the process of gradually increasing the intake air amount by the intake air amount control means for determining transmission state, and that the power transmission device is in the state of cutting power transmission when the vehicle speed obtained from the vehicle speed pulses does not reach the determination reference value before the rotational speed of the internal combustion engine exceeds the predetermined reference rotational speed.

The safety means may be comprised of the means for controlling the actuator so as to return the intake air amount to an idle air amount when the determination means determines that the power transmission device is in the state of transmitting power.

The safety means may be comprised of the means for stopping the ignition operation of the internal combustion engine when the determination means determines that the power transmission device is in the state of transmitting power.

The safety means may be comprised of the means for stopping supply of fuel to the internal combustion engine when the determination means determines that the power transmission device is in the state of transmitting power.

Although a preferred embodiment of the invention has been described and illustrated with reference to the accompanying drawings, it will be understood by those skilled in the art that they are by way of examples, and that various changes and modifications may be made without departing from the spirit and scope of the invention, which is defined only to the appended claims.

What is claimed is:

1. A transmission state determination method of a power transmission device for an internal combustion engine driven vehicle for determining whether said power transmission device is in a state of cutting power transmission or a state of transmitting power, said vehicle comprising:
    an internal combustion engine incorporated in a vehicle body having drive wheels;
    an AC generator incorporated in said vehicle body and driven by said internal combustion engine;
    mode selection means for selecting a control mode of said internal combustion engine between a control mode for driving vehicle and a control mode for generating electric power; and
    a generation control unit having rotational speed control means for generating electric power for controlling an intake air amount of said internal combustion engine so as to rotate said internal combustion engine at a rotational speed required for generating predetermined power from said generator when the control mode for generating electric power is selected by said mode selection means,
    wherein said power transmission device has a transmission with a gear position for cutting power transmission and an automatic clutch mechanism and is provided between a crankshaft of said internal combustion engine and said drive wheels, and
    a displacement sensor that can detect movement of said vehicle body is provided,
    said method comprises steps of;
    gradually increasing the intake air amount of said internal combustion engine while a rotational speed of said internal combustion engine is monitored when said control mode for generating electric power is selected, and
    determining that said power transmission device is in the state of transmitting power when said displacement sensor detects movement of said vehicle body in the step of gradually increasing said intake air amount, and that said power transmission device is in the state of cutting power transmission when said displacement sensor does not detect movement of said vehicle body before the rotational speed of said internal combustion engine exceeds a preset reference rotational speed in the step of gradually increasing said intake air amount.

2. A transmission state determination method of a power transmission device for an internal combustion engine driven vehicle for determining whether said power transmission device is in a state of cutting power transmission or a state of transmitting power, said vehicle comprising:
    an internal combustion engine incorporated in a vehicle body having drive wheels;
    an AC generator incorporated in said vehicle body and driven by said internal combustion engine;
    mode selection means for selecting a control mode of said internal combustion engine between a control mode for driving vehicle and a control mode for generating electric power; and
    a generation control unit having rotational speed control means for generating electric power for controlling an intake air amount of said internal combustion engine so as to rotate said internal combustion engine at a rotational speed required for generating predetermined power from said generator when the control mode for generating electric power is selected by said mode selection means,
    wherein said power transmission device has a transmission with a gear position for cutting power transmission and an automatic clutch mechanism and is provided between a crankshaft of said internal combustion engine and said drive wheels, and
    a vehicle speed sensor that generates a vehicle speed pulse for each rotation of an axle of said vehicle through a certain angle is used as a displacement sensor, and
    said method comprises steps of;
    gradually increasing an intake air amount of said internal combustion engine while a rotational speed of said internal combustion engine is monitored when said control mode for generating electric power is selected, and
    determining that said power transmission device is in the state of transmitting power when generation of the vehicle speed pulse by said vehicle speed sensor is detected in the process of gradually increasing said intake air amount, and that said power transmission device is in the state of cutting power transmission when generation of the vehicle speed pulse by the vehicle speed sensor is not detected before the rotational speed of said internal combustion engine exceeds a preset reference rotational speed in the process of gradually increasing said intake air amount.

3. A transmission state determination method of a power transmission device for an internal combustion engine driven vehicle for determining whether said power transmission device is in a state of cutting power transmission or a state of transmitting power, said vehicle comprising:

an internal combustion engine incorporated in a vehicle body having drive wheels;

an AC generator incorporated in said vehicle body and driven by said internal combustion engine;

mode selection means for selecting a control mode of said internal combustion engine between a control mode for driving vehicle and a control mode for generating electric power; and a generation control unit having rotational speed control means for generating electric power for controlling an intake air amount of said internal combustion engine so as to rotate said internal combustion engine at a rotational speed required for generating predetermined power from said generator when the control mode for generating electric power is selected by said mode selection means, wherein said power transmission device has a transmission with a gear position for cutting power transmission and an automatic clutch mechanism and is provided between a crankshaft of said internal combustion engine and said drive wheels, and a vehicle speed sensor that generates a vehicle speed pulse for each rotation of an axle of said vehicle through a certain angle is used as a displacement sensor, and said method comprises steps of;

gradually increasing a intake air amount of said internal combustion engine while a rotational speed of said internal combustion engine is monitored when said control mode for generating electric power is selected, and determining that said power transmission device is in the state of transmitting power when a vehicle speed obtained from said vehicle speed pulse reaches a set determination reference value or higher in the process of gradually increasing said intake air amount, and that said power transmission device is in the state of cutting power transmission when the vehicle speed obtained from said vehicle speed pulse does not reach said set determination reference value before the rotational speed of said internal combustion engine exceeds a preset reference rotational speed in the process of gradually increasing said intake air amount.

4. A transmission state determination device of a power transmission device for an internal combustion engine driven vehicle for determining whether said power transmission device is in a state of cutting power transmission or a state of transmitting power, said vehicle comprising:

an internal combustion engine incorporated in a vehicle body having drive wheels;

an AC generator incorporated in said vehicle body and driven by said internal combustion engine;

mode selection means for selecting a control mode of said internal combustion engine between a control mode for driving vehicle and a control mode for generating electric power; and a generation control unit having rotational speed control means for generating electric power for controlling an intake air amount of said internal combustion engine so as to rotate said internal combustion engine at a rotational speed required for generating predetermined power from said generator when the control mode for generating electric power is selected by said mode selection means, wherein said power transmission device has a transmission with a gear position for cutting power transmission and an automatic clutch mechanism and is provided between a crankshaft of said internal combustion engine and said drive wheels, and said transmission state determination device comprises:

rotational speed detection means for detecting a rotational speed of said internal combustion engine;

a displacement sensor that detects movement of said vehicle body;

intake air amount control means for determining transmission state for controlling said actuator so as to gradually increase the intake air amount of said internal combustion engine when the control mode for generating electric power is selected by said mode selection means; and determination means for determining that said power transmission device is in the state of transmitting power when said displacement sensor detects movement of said vehicle body in the process of gradually increasing said intake air amount by said intake air amount control means for determining transmission state, and that said power transmission device is in the state of cutting power transmission when said displacement sensor does not detect movement of said vehicle body before the rotational speed detected by said rotational speed detection means exceeds a set reference rotational speed in the process of gradually increasing said intake air amount.

5. A transmission state determination device of a power transmission device for an internal combustion engine driven vehicle for determining whether said power transmission device is in a state of cutting power transmission or a state of transmitting power, said vehicle comprising:

an internal combustion engine incorporated in a vehicle body having drive wheels;

an AC generator incorporated in said vehicle body and driven by said internal combustion engine;

mode selection means for selecting a control mode of said internal combustion engine between a control mode for driving vehicle and a control mode for generating electric power; and a generation control unit having rotational speed control means for generating electric power for controlling an intake air amount of said internal combustion engine so as to rotate said internal combustion engine at a rotational speed required for generating predetermined power from said generator when the control mode for generating electric power is selected by said mode selection means, wherein said power transmission device has a transmission with a gear position for cutting power transmission and an automatic clutch mechanism and is provided between a crankshaft of said internal combustion engine and said drive wheels, and said transmission state determination device comprises:

rotational speed detection means for detecting a rotational speed of said internal combustion engine;

a vehicle speed sensor that generates a vehicle speed pulse for each rotation of an axle of said vehicle through a certain angle;

intake air amount control means for determining transmission state for controlling said actuator so as to gradually increase the intake air amount of said internal combustion engine when the control mode for generating electric power is selected by said mode selection means; and determination means for determining that said power transmission device is in the state of transmitting power when said vehicle speed pulse is detected in the process of gradually increasing said intake air amount by said intake air amount control means for determining transmission state, and that said power transmission device is in the state of cutting power transmission when said vehicle speed pulse is not detected before the rotational speed detected by said rotational speed detection means exceeds a reference rotational speed in the process of gradually increasing said intake air amount.

6. A transmission state determination device of a power transmission device for an internal combustion engine driven vehicle for determining whether said power transmission device is in a state of cutting power transmission or a state of transmitting power, said vehicle comprising:

an internal combustion engine incorporated in a vehicle body having drive wheels;

an AC generator incorporated in said vehicle body and driven by said internal combustion engine;

mode selection means for selecting a control mode of said internal combustion engine between a control mode for driving vehicle and a control mode for generating electric power; and a generation control unit having rotational speed control means for generating electric power for controlling an intake air amount of said internal combustion engine so as to rotate said internal combustion engine at a rotational speed required for generating predetermined power from said generator when the control mode for generating electric power is selected by said mode selection means, wherein said power transmission device has a transmission with a gear position for cutting power transmission and an automatic clutch mechanism and is provided between a crankshaft of said internal combustion engine and said drive wheels, and said transmission state determination device comprises:

rotational speed detection means for detecting a rotational speed of said internal combustion engine;

a vehicle speed sensor that generates a vehicle speed pulse for each rotation of an axle of said vehicle through a certain angle;

intake air amount control means for determining transmission state for controlling said actuator so as to gradually increase the intake air amount of said internal combustion engine when the control mode for generating electric power is selected by said mode selection means; and determination means for determining that said power transmission device is in the state of transmitting power when a vehicle speed obtained from said vehicle speed pulse reaches a set determination reference value or higher in the process of gradually increasing said intake air amount by said intake air amount control means for determining transmission state, and that said power transmission device is in the state of cutting power transmission when the vehicle speed obtained from said vehicle speed pulse does not reach said determination reference value before the rotational speed of said internal combustion engine exceeds a predetermined reference rotational speed in the process of gradually increasing said intake air amount.

7. A runaway prevention device of an internal combustion engine driven vehicle for preventing runaway of said internal combustion engine driven vehicle when a control mode for generating electric power is selected, said internal combustion engine driven vehicle comprising:

an internal combustion engine incorporated in a vehicle body having drive wheels;

a power transmission device that has a transmission with a gear position for cutting power transmission and an automatic clutch mechanism that enters a state of transmitting power when a rotational speed of the internal combustion engine reaches a predetermined power transmission start rotational speed or higher, and is provided between a crankshaft of said internal combustion engine and said drive wheels;

an actuator that operates means for adjusting an intake air amount of said internal combustion engine;

an AC generator incorporated in said vehicle body and driven by said internal combustion engine;

mode selection means for selecting a control mode of said internal combustion engine between a control mode for driving vehicle and a control mode for generating electric power; and a generation control unit having rotational speed control means for generating electric power for controlling the intake air amount of said internal combustion engine so as to rotate said internal combustion engine at a rotational speed required for generating predetermined power from said generator when the control mode for generating electric power is selected by said mode selection means, wherein said runaway prevention device comprises:

rotational speed detection means for detecting a rotational speed of said internal combustion engine;

a displacement sensor that detects movement of said vehicle body;

intake air amount control means for determining transmission state for controlling said actuator so as to gradually increase the intake air amount of said internal combustion engine when the control mode for generating electric power is selected by said mode selection means;

determination means for determining that said power transmission device is in a state of transmitting power when said displacement sensor detects movement of said vehicle body in the process of gradually increasing said intake air amount by said intake air amount control means for determining transmission state, and that said power transmission device is in a state of cutting power transmission when said displacement sensor does not detect movement of said vehicle body before the rotational speed detected by said rotational speed detection means exceeds a set reference rotational speed in the process of gradually increasing said intake air amount; and safety means for controlling said internal combustion engine so as to return the rotational speed of said internal combustion engine to a rotational speed less than said power transmission start rotational speed or to stop said internal combustion engine when said determination means determines that said power transmission device is in the state of transmitting power.

8. The runaway prevention device of the internal combustion engine driven vehicle according to claim 7, wherein said safety means is comprised of means for controlling said actuator so as to return said intake air amount to an idle air amount when said determination means determines that said power transmission device is in the state of transmitting power.

9. The runaway prevention device of the internal combustion engine driven vehicle according to claim 7, wherein said safety means is comprised of means for stopping an ignition operation of said internal combustion engine when said determination means determines that said power transmission device is in the state of transmitting power.

10. The runaway prevention device of the internal combustion engine driven vehicle according to claim 7, wherein said safety means is comprised of means for stopping supply of fuel to said internal combustion engine when said determination means determines that said power transmission device is in the state of transmitting power.

11. A runaway prevention device of an internal combustion engine driven vehicle for preventing runaway of said internal combustion engine driven vehicle when a control mode for generating electric power is selected, said internal combustion engine driven vehicle comprising:
  an internal combustion engine incorporated in a vehicle body having drive wheels;
  a power transmission device that has a transmission with a gear position for cutting power transmission and an automatic clutch mechanism that enters a state of transmitting power when a rotational speed of the internal combustion engine reaches a predetermined power transmission start rotational speed or higher, and is provided between a crankshaft of said internal combustion engine and said drive wheels;
  an actuator that operates means for adjusting an intake air amount of said internal combustion engine;
  an AC generator incorporated in said vehicle body and driven by said internal combustion engine;
  mode selection means for selecting a control mode of said internal combustion engine between a control mode for driving vehicle and a control mode for generating electric power; and
  a generation control unit having rotational speed control means for generating electric power for controlling the intake air amount of said internal combustion engine so as to rotate said internal combustion engine at a rotational speed required for generating predetermined power from said generator when the control mode for generating electric power is selected by said mode selection means,
  wherein said runaway prevention device comprises:
  rotational speed detection means for detecting a rotational speed of said internal combustion engine;
  a vehicle speed sensor that generates a plurality of vehicle speed pulses for one rotation of an axle of said vehicle;
  intake air amount control means for determining transmission state for controlling said actuator so as to gradually increase the intake air amount of said internal combustion engine when the control mode for generating electric power is selected by said mode selection means;
  determination means for determining that said power transmission device is in a state of transmitting power when said vehicle speed pulses are detected in the process of gradually increasing said intake air amount by said intake air amount control means for determining transmission state, and that said power transmission device is in a state of cutting power transmission when said vehicle speed pulses are not detected before the rotational speed detected by said rotational speed detection means exceeds a set reference rotational speed in the process of gradually increasing said intake air amount; and
  safety means for controlling said internal combustion engine so as to return the rotational speed of said internal combustion engine to a rotational speed less than said power transmission start rotational speed or to stop said internal combustion engine when said determination means determines that said power transmission device is in the state of transmitting power.

12. The runaway prevention device of the internal combustion engine driven vehicle according to claim 11, wherein said safety means is comprised of means for controlling said actuator so as to return said intake air amount to an idle air amount when said determination means determines that said power transmission device is in the state of transmitting power.

13. The runaway prevention device of the internal combustion engine driven vehicle according to claim 11, wherein said safety means is comprised of means for stopping an ignition operation of said internal combustion engine when said determination means determines that said power transmission device is in the state of transmitting power.

14. The runaway prevention device of the internal combustion engine driven vehicle according to claim 11, wherein said safety means is comprised of means for stopping supply of fuel to said internal combustion engine when said determination means determines that said power transmission device is in the state of transmitting power.

15. A runaway prevention device of an internal combustion engine driven vehicle for preventing runaway of said internal combustion engine driven vehicle when a control mode for generating electric power is selected, said internal combustion engine driven vehicle comprising:
  an internal combustion engine incorporated in a vehicle body having drive wheels;
  a power transmission device that has a transmission with a gear position for cutting power transmission and an automatic clutch mechanism that enters a state of transmitting power when a rotational speed of the internal combustion engine reaches a predetermined power transmission start rotational speed or higher, and is provided between a crankshaft of said internal combustion engine and said drive wheels;
  an actuator that operates means for adjusting an intake air amount of said internal combustion engine;
  an AC generator incorporated in said vehicle body and driven by said internal combustion engine;
  mode selection means for selecting a control mode of said internal combustion engine between a control mode for driving vehicle and a control mode for generating electric power; and
  a generation control unit having rotational speed control means for generating electric power for controlling the intake air amount of said internal combustion engine so as to rotate said internal combustion engine at a rotational speed required for generating predetermined power from said generator when the control mode for generating electric power is selected by said mode selection means,
  wherein said runaway prevention device comprises:
  rotational speed detection means for detecting a rotational speed of said internal combustion engine;

a vehicle speed sensor that generates a plurality of vehicle speed pulses for one rotation of an axle of said vehicle;

intake air amount control means for determining transmission state for controlling said actuator so as to gradually increase the intake air amount of said internal combustion engine when the control mode for generating electric power is selected by said mode selection means;

determination means for determining that said power transmission device is in a state of transmitting power when a vehicle speed obtained from said vehicle speed pulses reaches a set determination reference value or higher in the process of gradually increasing said intake air amount by said intake air amount control means for determining transmission state, and that said power transmission device is in a state of cutting power transmission when the vehicle speed obtained from the vehicle speed pulses does not reach said determination reference value before the rotational speed of said internal combustion engine exceeds a predetermined reference rotational speed; and safety means for controlling said internal combustion engine so as to return the rotational speed of said internal combustion engine to a rotational speed less than said power transmission start rotational speed or to stop said internal combustion engine when said determination means determines that said power transmission device is in the state of transmitting power.

16. The runaway prevention device of an internal combustion engine driven vehicle according to claim 15, wherein said safety means is comprised of means for controlling said actuator so as to return said intake air amount to an idle air amount when said determination means determines that said power transmission device is in the state of transmitting power.

17. The runaway prevention device of an internal combustion engine driven vehicle according to claim 15, wherein said safety means is comprised of means for stopping an ignition operation of said internal combustion engine when said determination means determines that said power transmission device is in the state of transmitting power.

18. The runaway prevention device of an internal combustion engine driven vehicle according to claim 15, wherein said safety means is comprised of means for stopping supply of fuel to said internal combustion engine when said determination means determines that said power transmission device is in the state of transmitting power.

* * * * *